United States Patent Office
3,449,488
Patented June 10, 1969

3,449,488
IMMUNOLOGY
John Bozicevich, Bethesda, Md., assignor, by mesne assignments, to Bionetics Research Laboratories, Inc., Falls Church, Va., a corporation of Delaware
No Drawing. Filed Oct. 22, 1965, Ser. No. 502,627
Int. Cl. G01n 33/16
U.S. Cl. 424—8
9 Claims

ABSTRACT OF THE DISCLOSURE

A test material is disclosed for the detection of rubella virus antibodies, as well as the method of preparing the test material and performing the test. The test material is a suspension of colloidal clay particles having rubella virus antigen adsorbed thereon. In the presence of rubella antibodies, the test particles flocculate, thereby indicating the antibody presence. The antigen is a purified product from which substantially all crystalloids and extraneous proteins have been removed in the process of preparing same from a tissue culture of the rubella virus.

---

This invention relates to improvements in immunology and generally to an improved test material and method for the detection of antigens from microorganisms, parasites and other macromolecular agents and derivatives thereof and for the detection of antibodies thereto. Illustratively, the invention may be effectively employed in the detection of rubella virus and the assay of antibodies thereto.

As is known, rubella (German measles) is an acute, contagious, eruptive disease of short duration. This disease is of viral etiology. In recent years it has been noted that the frequency of serious congenital defects in children born of mothers acquiring rubella during the first trimester of pregnancy is quite high. This effect of rubella in pregnancy represents perhaps the most serious result of the infection, and has focused the attention of the medical profession on the need for a simple rapid method of accurately detecting the presence of the virus or the antibodies thereto.

The characteristics of the virus are such as to impose limitations on a diagnostic test approach. That is, rubella virus does not possess apparent hemagglutinating or hemadsorbing characteristics, unlike many other viruses.

It has ben only recently that the characterization of rubella virus has been achieved. The isolation of the virus has been accomplished independently by Weller and Neva (Proc. Soc. Exp. Biol. & Med. 111: 215, 1962) and by Parkman, Buescher and Artenstein (Proc. Soc. Exp. Biol. & Med. 111; 225, 1962). The methods currently used for isolation and propagation of rubella stem from the findings of the two different techniques reported in the above publications.

Weller and Neva found that rubella virus grew in cultures of primary human amnion cells (PHA), and produced distinctive but subtle cytopathic effects (CPE). The test to detect the prescence of the virus based on this technique involves a considerable period of time and requires a highly skilled technician to interpret the results.

Parkman and co-workers, at the Walter Reed Army Institute of Research, Department of Virus Diseases, developed an indirect or interference technique based on their findings that rubella infected cultures of grivet monkey kidney cells (GMK) were resistant when challenged with the enterovirus, ECHO–11.

Modifications of these two basic techniques have been proposed by other researchers in this field involving, for example, the use of a special line of rabbit kidney cells ($RK_{13}$) which were found to exhibit rubella induced cytopathic effects, and interference procedures involving the use of other cell lines. Additionally, other workers have found that other enteroviruses, such as Coxsackie A–9, can be used as the challenge virus in the interference procedure.

It is known that patients with German measles exhibit increases in serum neutralizing antibody and that titers of antibody of substantial level are maintained for years. Some serological methods for the measurement of antibody to rubella and for identification of the agent are based essentially on neutralization tests which, in effect, are applications of the two previously described methods of isolation of the virus; namely, inhibition of rubella CPE or inhibition of the rubella interference phenomenon.

The serological neutralization antibody assay test developed at Walter Reed and quite generally employed is based on the method using ECHO–11 as the challenge virus. Another comparable procedure employs Coxsackie A–9 as the challenge virus. Each of these procedures requires a considerable period of time on the order of ten to twelve days. The accuracy of these tests are affected by a number of factors, such as the absence of rapid and obvious cytopathic effect, incomplete neutralization of virus by antibody, critical adjustment of rubella virus dose and the inherent difficulty of standardizing the neutralization procedure.

More recently, two other serological tests for the measurement of rubella antibody have been developed. A complement fixation test has been described by Sever et al., (Science, 148: 385, 1965), and an indirect fluorescent antibody test by Brown et al., (Science, 145: 943, 1964). Both of these procedures are expensive to perform and require specially trained personnel to interpret the results.

It is thus apparent that there is real and current need for a simple, accurate laboratory test for the detection of rubella and for assaying antibody thereto which can be effectively standardized, which can be carried out in a brief period of time by a reasonably well-trained technician, and the results of which are diagnostically significant.

A major object of the present invention is to devise improved materials and method for the detection of antigens from microorganisms, parasites and other macromolecular agents and derivatives thereof and of antibodies thereto.

Another salient object of the invention is to provide improved methods for the detection of antigens from microorganisms, parasites and other macromolecular agents and derivatives thereof and of antibodies thereto which can be carried out in a very short period of time by operators of normal laboratory skill.

A further object of the invention is to provide novel antigen sensitized colloidal substrates such as bentonite which are potentially agglomerable on addition of a to-be-tested antibody to accurately indicate the presence of such antibody; or, novel antibody sensitized colloidal substrates such as bentonite which are potentially agglomerable on addition of a to-be-tested antigen to accurately indicate the presence of such antigen.

An additional object of the invention is to provide improved test material particularly purified and adapted for sensitizing potentially agglomerable substrates used in diagnostic tests.

Yet a further object of the invention is to provide a method and materials for the routine detection of rubella virus or antibodies thereto which are accurate and highly specific and the use of which substantially increases diagnostic significance.

These and other equally important and related objects are achieved by invoking the principles of the invention and utilizing the procedures and materials to be described hereinafter.

The invention may best be understood in connection with its use as a rapid, accurate and specific fluocculation test for the detection of virus, such as rubella, and for measurement of antibodies thereto.

In recent years the potentialities of using bentonite fluocculation tests for antibody measurements have been investigated. Such a flocculation test in effect provides a useful tool in certain antigent or antibody detection and is partlcuarly characterized by the simplicity and rapidity of testing. The utility of such a method has been demonstrated and reported as, for example, in the following publications: J. Bozicevich et al., "A Rapid Flocculation Tets for the Diagnosis of Trichinosis," Public Health Service Bull. No. 25, vol. 66, pp. 806–814, 1951; J. Bozicevich et al., "Bentonite Flocculation Test for Rheumatoid Arthritis," Proc. Soc. Exp. Biol. and Med. 97: pp. 180–183, 1958; J. Bozicevich et al., "Bentonite Flocculation Test for Lupus Erythematosus," Proc. Soc. Exp. Biol. and Med. 103: pp. 636–640, 1960; J. Bozicevich et al., "The Bentonite Flocculation Test for Detection of Plant Viruses and Titration of Antibodies," Proc. Soc. Exp. Biol. and Med. 114: pp. 750–754, 1963.

As will be seen more fully hereinafter the present invention utilizes the principles and phenomena involved in such flocculation tests in conjunction with specific novel procedures which result in improved and unobvious antigen and/or antibody measurements.

In carrying out the invention with rubella wirus as an example, a substrate of suspended colloidal particles of a selected particle size having special flocculating and adsorption properties is sensitized with a selected specially processed rubella antigen. Such a stock suspension of the substrate may be made up and, if desired, stored for current use. The test procedure of the invention essentially involves the addition of a diluted serum specimen into a series of rings formed on a microscope slide and the antigen sensitized colloidal suspension is added. The slide is then rotated on a suitable apparatus and resulting flocculation reactions are then read. A notable advantage of this method is, as found from experience, that when stored at a temperature of about 5° C., the potential reactivity of the stock substrate remains stable for a prolonged period of time. As markedly contrasted with earlier laboratory techniques mentioned above, the described flucculation test is extremely simple and can be conducted in a matter of about twenty minutes once the stock solutions are prepared.

Since the test procedure of the present invention depends essentially on the clumping of fine, sensitized, colloidal particles, the preparation of the stock suspension is most important. As a result of considerable experimentation and research, it has been found that bentonite functions very effectively as the flocculating substrate in the test. This material is readily available and is comprised of negatively charged particles whose surface/mass ratio is unusually high. After such particles are sensitized with a selected antigen, they clump when mixed with homologus antibodies, which clumping is readily observed under a microscope.

In preparing the stock bentonite suspension, it is convenient to suspend 0.5 gram of BC micron or No. 200 standard "Volclay" in one hundred ml. of distilled water. ("Volclay" is a Wyoming bentonite obtainable from American Colloid Company, Skokie, Illinois). This initial suspension is then homogenized in a Waring Blender for a period of one minute and blending is repeated, after a five-minute interval, for an additional minute. After such blending, the suspension is transferred to a 500 ml. glass stoppered graduate and distilled water is added to make up to 500 ml. This diluted suspension is then shaken thoroughly and allowed to settle for a period of one hour, after which the supernate is poured off and the sediment is discarded. The separated supernate is poured into six 100 ml. heavy duty centrifuge tubes and is centrifuged at 1,300 r.p.m. for fifteen minutes. For this purpose, it is preferred to use an International Centrifuge PR-2 with a No. 240 head. After such initial centrifugation, the supernate is poured off and saved and the sediment discarded. Such supernate, transferred to six 100 ml. tubes is centrifuged at 1,600 r.p.m. for a period of fifteen minutes and the supernate is discarded. The accumulated sediment from the six tubes is re-suspended in 100 ml. of distilled water and is homogenized in a Waring Blender for a period of one minute. This product comprises a stock bentonite suspension which, as noted previously, has remained stable for a period of six months when stored at room temperature.

It is particularly to be observed that it is important to have the colloidal particles of the bentonite of a size such as is obtained by sequential centrifugation at 1,300–1,600 r.p.m. to obtain an approximate centrifugation range of 650–700 g. The larger colloidal particles which are obtained by centrifugation at speeds of less than approximately 650 g. (1,300 r.p.m.) have a tendency to flocculate spontaneously, thus tending to give false positive reactions in the test while, on the other hand, the ultra-fine smaller particles obtained by centrifugation at speeds greater than approximately 700 g. (1,600 r.p.m.) do not tend to flocculate as rapidly in the presence of positive serum. It has been noted that if the described stock suspension which has been suspended in 100 ml. of fresh distilled water after the 1,600 r.p.m. centrifugation is now centrifuged again at 1,300 r.p.m. practically all of the particles are thrown down. It is thus apparent that the particle size fractionation of the bentonite is an important feature of its preparation and, as it has been found from experience, is conducive to accurate and reliable test results.

In a modified, and preferred, procedure the desirable high degree of dispersion of the stock substrate may be achieved without resort to the mechanical agitation produced in a high speed mixer such as a Waring Blender.

In this procedure 0.5 gm. of the described bentonite is dispersed, with simple mixing in 100 ml. of an effective dispersant such as acetone. This predispersed suspension of bentonite is diluted up to 500 ml. with distilled water, agitated and the dispersion is allowed to stand over night to permit settling of the heavier bentonite particles. The supernate is decanted and centrifuged sequentially at 1,300–1,600 r.p.m., as previously described, and the resultant solids are dispersed in 100 ml. of distilled water to form the stock suspension. The carefully controlled size of the bentonite particles in the stock suspension is an effective contributing factor to the speed and accuracy of subsequent test procedures. The bentonite starting material employed comprises approximately 90% of particles less than 0.5 micron in size. Due to their highly hydrophylic character these particles increase in volume approximately fifteen times in the stock suspension.

The culture of rubella employed in the test procedure may be derived from any of the known and tested strains. Thus rubella strains M–33 and RV may be employed; antigenic materials may be obtained by in vitro subpassage of tissue culture supernatant fluids into primary African green monkey kidney, BSC–1, RK–13 or other suitable cell cultures. The chronically infected Rhesus monkey kidney cell line, RCC–LLC–$MK_2$, may also be used.

A most important phase of the invention which is critical in assuring optimum results in the test procedures is the careful fractionation and purification of the antigen or antibody employed. The efficacy of the test and accuracy of the results depend upon the substantially quantitative removal of crystalloids and extraneous proteins. The failure to fully fractionate and purify the antigen or antibody induces inaccurate, undependable results in the flocculation test.

It has been found from considerable experience that the presence of residual salts induces spurious flocculation of the bentonite and extraneous proteins compete with the test antigen in adsorption onto bentonite. This necessity was not recognized heretofore and accounts for the failure of attempts in the past to achieve accurate results in flocculation tests, and particularly in flocculation tests with rubella.

This purification may be achieved by several methods. In one method, after harvesting the yield of virus culture, the harvest is lyophilized to increase the concentration and dialyzed for a period of 2 to 3 days against recurrent numerous changes of distilled water until the soluble salts and distilled water-insoluble proteins of the suspension are removed without any appreciable loss of antigenic constituents of the suspension.

In a second method, the harvest is precipitated by adding sufficient ammonium sulfate or an equivalent protein precipitant in an amount to give a final concentration equal in effect to 30–60% of ammonium sulfate, and allowing the solution to stand over night under refrigeration. Thereafter the material is centrifuged, the supernate recovered, dialyzed for several days to remove soluble salts and other precipitants, and finally centrifuged to remove insoluble denatured proteins. This clarified solution is then preferably concentrated by pervaporation to approximately one-tenth to one-third of its original volume.

The test material, purified by either method, is then adsorbed on the described bentonite stock suspension to provide the sensitized material employed in the described test. This is effected by adjusting the solution to alkalinity and preferably to pH 7.2 to 8. The stock bentonite suspension is then added to the liquid antigen concentrate in an amount to satisfy the bentonite adsorption affinity and allowed to stand over night in a refrigerator to insure optimum adsorption on the bentonite particles. After such adsorption 1 ml. of a 0.1% solution of methylene blue is added and the material is centrifuged and the supernate discarded.

It has been found that the sensitivity of the resultant flocculation test may be enhanced if the concentrated test material is heated before adsorption on the bentonite. The amount of heating accomplished is limited by the type of test material employed for the heating must not be intensive enough to destroy the characteristics of the test material. With rubella antigen it has been found that heating to approximately 56°–80° C. for ten minutes before adsorption increases the sensitivity of the flocculation test.

The recovered bentonite complex is thoroughly agitated in 15 ml. of physiological saline solution or distilled water and the suspension is centrifuged. This washing procedure is repeated a second time. The washed pellet is then agitated in a Vortex mixer with 5 ml. of distilled water and an effective amount of a wetting agent. While any anionic or non-ionic surfactant may be used, it has been found that polyvinyl pyrrolidone gives the most stable dispersion. This agent is preferably added in the proportion of 0.1 ml. of a 1% aqueous solution to the 5 ml. of sensitized bentonite solution. Thereafter a suitable preservative is added, which preferably is 0.1 ml. of a 3% aqueous solution of merthiolate.

In lieu of the noted wetting agents, stabilization of the sensitized suspension may be effected by incorporating a sutiable protective colloid therewith. Many well known protective colloids may be employed; as for example, bovine serum albumin, egg albumin and similarly functioning proteins.

In carrying out the test, microscope slides 3" x 2", provided with wax rings on one surface, are employed. The blood serum to be tested is prepared in selected dilutions in physiological saline; for example, in two-fold serial dilutions from undiluted to 1:128 or to the end point.

Into each ring of the slide 0.1 ml. of the serial dilutions of the serum is introduced by means of a pipette. One drop of the sensitized suspension (between 0.05 to 0.1 ml.) is added to each ring by means of a pipette. The slide is then placed on a rotating apparatus such as a Boerner-type rotating machine, and rotated at a speed of 100 to 125 times per minute for a period of about 20–30 minutes. The slide is then read immediately under a microscope at low power magnification (approximately 60×).

As a result of considerable experience, it has been found that the readings may be quite accurately characterized numerically. Thus a 4+ reaction denotes that all of the sensitized particles are clumped in separate masses. There may be some non-uniformity in the sizes of the clumps, depending on the titer of the serum, but the fields between the clumps are substantially clear. In a 3+ reaction, an estimated three-fourths of the bentonite particles are clumped; in a 2+ reaction, half; and in a 1+ reaction, one-fourth. In a negative test none of the bentonite particles are clumped, but remain in suspension.

After some experience with this testing technique, spurious aggregates, which may be caused by debris in the sensitized bentonite or in the serum, may readily be distinguished from true flocculation.

It has been found from considerable testing that the results of the described test for rubella antibodies correlate closely with results of the standard neutralization tests on the same serum.

As indicated, the flocculation test technique described heretofore with respect to the measurement of antibodies conversely may be employed for antigen measurement. For this purpose the bentonite suspension, produced in the manner described, is sensitized with a known antibody test material, and this admixed and agitated with an antigen test sample in the wax rings of the described microscope slide, and the degree of clumping is ascertained. The antibody test material must be purified to remove crystalloids and to obtain the gamma globulin fraction before adsorption thereof on the bentonite.

It will be understood that, while for illustrative purposes, the invention has been described particularly in relation to its utility in detecting rubella and assaying rubella antibodies, these improved techniques described herein may be used for the detection of antigens from microorganisms, parasites, and other macromolecular agents and derivatives thereof and of antibodies thereto, which respond to the flocculation test. Thus preliminary studies indicate that the procedures contemplated by the invention may be utilized for the detection of other viruses, such as Polio, ECHO, Adeno and EDIM, this method similarly may be employed for testing of microorganisms, specifically for such bacteria as Salmonella, E. coli and the Serratia species, and for test determinations on fungi, such as Cryptococcus, Candida, and the like, by flocculation testing, as well as for proteinaceous materials, which may occur in body exudates.

It will be appreciated that the purpose of the addition of methylene blue is to aid in the visual determination of the degree of clumping. While because of its high adsorption on bentonite, methylene blue is the dye of choice, it will be appreciated that other dyes substantive to bentonite may be utilized. While these dyes may be adsorbed on the bentonite, they may, if desired, be selectively added only to the antibody or antigen test material before its adsorption on the bentonite or the dye may be added to the sensitized suspension after the test sample is adsorbed.

Similarly, while the technique of the described test involves reading of dyed clumps by direct light, it is also within the contemplation of the invention to evaluate the degree of flocculation by other techniques. For example, a fluorescent material such as fluorescein isothiocyanate may be added to an antigen or antibody before it is adsorbed on bentonite, to the betonite before such adsorption, or to the sensitized suspension after such adsorption as contemplated herein, and the flocculated material on the microscope slide may be irradiated with incident ultraviolet light. The emitted radiations from the test clumped material provide sharp contrast to insure accurate estimation or measurement of the degree of flocculation.

It will be understood also that the determination need not necessarily depend on the direct visual observation of the degree of clumping of the bentonite. Such flocculation may be indicated very accurately, for example, by utilizing a photoelectric cell on one side of the slide, in association with a light source of constant luminosity on the other side. The degree or magnitude of clumping is thus directly reflected in the electrical output of the cell, which can be amplified and indicated on a suitable graduated dial.

Similarly, the degree of flocculation or clumping may be assessed through the use of radioisotope techniques. In this technique the radioactive tagged material may be associated with the sensitized bentonite reagent in several different modifications. The bentonite itself may be rendered inherently radioactive by the method of neutron activation and then subsequently processed as previously described to give a radioactive sensitized bentonite test reagent. In another modification, a radioactive compound such as C–14 labelled methylene-blue may be adsorbed to the sensitized bentonite test reagent by the process described for the adsorption of unlabelled methylene-blue; in a further modification, the antigenic or antibody material may be labelled with a radioactive compound such as Iodine–131 and then be adsorbed on the bentonite by the process herein described for unlabelled antigen. In all the modifications cited, the immunological characteristics of the sensitized bentonite test material remain the same. However, by the measurement of the concentration of radioactive material in the clumped or flocculated material by a suitable counting system such as scintillation counter, a particularly accurate and sensitive measurement of the test sample can be achieved.

It will now be appreciated that the invention provides an improved test material and method for the detection of certain antibodies and antigens which may be effectively employed to aid in the detection of viral, bacterial, fungal and proteinaceous agents.

As noted, the test is simple, accurate, and does not require highly skilled personnel to perform.

I claim:

1. A test material for the detection of rubella virus antibodies, consisting essentially of an aqueous suspension of colloidal clay particles having a size fraction thrown down by differential centrifugation at approximately 650 and 700 g., said clay particles having adsorbed thereon rubella virus antigen substantially free of crystalloids and extraneous proteins.

2. A test material as set forth in claim 1 wherein said clay is a bentonite clay.

3. A test material as set forth in claim 2, and further including a dye.

4. In the process of producing a test product for the detection of rubella virus antibodies, wherein the antigen of said virus is adsorbed on the particles of a finely divided colloidal suspension of a clay, said antigen being derived from a tissue culture of said virus, the improvement which consists of isolating said antigen from substantially all crystalloids and extraneous proteins of said culture, and adsorbing the resulting isolated antigen on said clay.

5. In the process of claim 4, the antigen isolation being effected by dialysis against recurrent changes of distilled water.

6. A method of producing a test material for rubella virus antibody assay from a rubella virus culture which comprises harvesting, concentrating the harvest, subjecting the concentrate to dialysis against recurrent changes of distilled water for a period of time sufficient to substantially remove soluble salts and precipitate extraneous proteins insoluble in distilled water, removing the precipitated proteins, recovering the dialyzed resulting product adsorbing the product on finely divided suspended clay particles, centrifuging the suspension to remove excess unadsorbed material, to recover the sensitized particles, washing the recovered particles in physiological saline solution, recovering the particles from the saline solution, and suspending said recovered particles in distilled water.

7. The method of claim 6, wherein the clay is a bentonite clay.

8. A method of producing a test product for rubella virus antibody assay from a rubella virus culture which comprises harvesting the culture, adding a protein precipitant to said harvest to obtain a solution having a final concentration of precipitant equal in effect to 30 to 60% of ammonium sulfate, allowing the resulting precipitate to settle out of the solution, separating a supernatant solution from the settled precipitate by centrifugation, subjecting the separated supernatant solution to dialysis against recurrent changes of distiled water for a period of time sufficient to substantially remove crystalloids and to precipitate proteins insoluble in distilled water, removing the precipitated proteins; subjecting the dialyzed solution to pervaporation for a period of time sufficient to increase the concentration thereof to approximately $\frac{1}{10}$ to $\frac{1}{3}$ of the original volume, adsorbing the concentrated solution on finely divided colloidal clay particles in aqueous suspension, separating the sensitized particles from said aqueous suspension, washing said separated particles in physiological saline solution, and suspending the washed particles in distilled water.

9. The method of claim 8, wherein the clay is a bentonite clay.

References Cited

UNITED STATES PATENTS

| 2,439,229 | 4/1948 | Vanderscheer | 167—84.5 |
| 3,141,824 | 7/1964 | Dahlstrom | 167—78 |
| 3,316,153 | 4/1967 | Van Frank | 167—78 |
| 3,313,706 | 4/1967 | Lembke | 167—78 |

OTHER REFERENCES

Bozicevich: PSEBM; vol. 114, December 1963, pp. 794–978.

Bozicevich: PSEMB; vol. 103, March 1960, pp. 636–630.

ALBERT T. MEYERS, *Primary Examiner.*

A. P. FAGELSON, *Assistant Examiner.*

U.S. Cl. X.R.

195—1.5; 424—12, 23, 89